(12) United States Patent
Geisow et al.

(10) Patent No.: US 7,326,449 B2
(45) Date of Patent: Feb. 5, 2008

(54) LIQUID CRYSTAL DEVICE

(75) Inventors: Adrian Derek Geisow, Portishead (GB); Stephen Christopher Kitson, Alveston (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

(21) Appl. No.: 10/419,763

(22) Filed: Apr. 22, 2003

(65) Prior Publication Data

US 2003/0203130 A1    Oct. 30, 2003

(30) Foreign Application Priority Data

Apr. 30, 2002    (GB)    ................ 0209945.5

(51) Int. Cl.
   *C09K 19/56*    (2006.01)
(52) U.S. Cl. .............. 428/1.2; 349/127; 349/128; 349/94; 428/1.1
(58) Field of Classification Search ......... 428/1.1, 428/1.2; 349/123, 127–128, 94
   See application file for complete search history.

(56) References Cited

U.S. PATENT DOCUMENTS

| 5,073,294 | A |   | 12/1991 | Shannon et al. ....... 252/299.01 |
| 5,155,610 | A |   | 10/1992 | Hikmet et al. ............... 359/75 |
| 5,262,882 | A |   | 11/1993 | Hikmet .......................... 359/75 |
| 5,686,019 | A | * | 11/1997 | Nakamura ............ 252/299.01 |
| 5,757,455 | A | * | 5/1998  | Sugiyama et al. .......... 349/129 |
| 6,151,090 | A | * | 11/2000 | Tanaka et al. ............... 349/134 |
| 6,201,588 | B1 |  | 3/2001  | Walton et al. ............... 349/123 |
| 6,452,573 | B1 | * | 9/2002 | Martinot-Lagarde et al. .. 345/8 |
| 7,105,209 | B2 | * | 9/2006 | Heckmeier et al. .......... 428/1.1 |

FOREIGN PATENT DOCUMENTS

| EP | 0 506 175 A2 | 9/1992 |
| EP | 1 139 151 A1 | 10/2001 |
| EP | 1 139 153 A1 | 10/2001 |
| EP | 1 139 154 A1 | 10/2001 |
| GB | 2 286 647    | 2/1994 |
| JP | 11-326880    | 11/1999 |
| WO | 96/24880     | 8/1996 |

(Continued)

OTHER PUBLICATIONS

Cognard, J., "Alignment of Nematic Liquid Crystals and Their Mixtures," Molecular Crystals and Liquid Crystals Supplement Series, Supplement 1, Chemistry Group, Asulab S.A., Neuchatel, Switzerland.

(Continued)

*Primary Examiner*—Rena Dye
*Assistant Examiner*—Sow-Fun Hon

(57) ABSTRACT

A liquid crystal device comprises first and second opposed spaced-apart cell walls enclosing a layer of a liquid crystal material. Electrodes are provided on at least one cell wall for applying an electric field across at least some of the liquid crystal material. The first cell wall is provided with a first surface layer substantially comprising a polymerised aligned mesogenic material, which surface layer is in contact with the liquid crystal material. Preferably the alignment of the polymerised mesogenic material is substantially uniform across substantially the entire area of the display. The inner surface of the second cell wall may be provided with a similar second surface layer, preferably wherein the anchoring energy and/or order parameter of the liquid crystal adjacent the two surface layers is different.

27 Claims, 1 Drawing Sheet

FOREIGN PATENT DOCUMENTS

| | | |
|---|---|---|
| WO | 97/14990 | 4/1997 |
| WO | 99/34251 | 7/1999 |
| WO | 02/48801 A2 | 6/2002 |

OTHER PUBLICATIONS

Thurston, R. et al., "Mechanically Bistable Liquid-Crystal Display Structures," IEEE Transactions on Electronic Devices, vol. ED-27, Nov. 1980, pp. 2069-2080.

Dozov, I. et al., "Fast bistable nematic display using mon stable surface switching," Appl. Phys. Lett. 70(9), American Institute of Physics, Mar. 3, 1997, pp. 1179-1181.

Cheng, J. et al., "The liquid-crystal alignment properties of photo-lithographic gratings," Appl. Phys. Lett. 35(6), American Institute of Physics, Sep. 15, 1979, pp. 444-446.

Yamamoto, T. et al., "Pretilt-angle control of liquid-crystal alignment by using projections on substrate surfaces for dual-domain TN-LCD," Journal of the SID, 4/2, 1996, pp. 83-87.

Berreman, D., "Alignment of Liquid Crystals by Grooved Surfaces," Molecular Crystals and Liquid Crystals, vol. 23 1972 215-231.

* cited by examiner

LIQUID CRYSTAL DEVICE

FIELD OF THE INVENTION

This invention relates to a liquid crystal device, notably a display device, and to a method of manufacturing the device.

BACKGROUND OF THE INVENTION

Liquid crystal (LC) materials are rod-like or lath-like molecules which have different optical properties along their long and short axes. The molecules exhibit some long range order so that locally they tend to adopt similar orientations to their neighbours. The local orientation of the long axes of the molecules is referred to as the "director". Liquid crystals may broadly be classified as thermotropic (formed or modified by heat) or lyotropic (formed or modified by the action of a solvent). Commercial liquid crystal display devices use thermotropic liquid crystals.

There are three main types of thermotropic LC materials: nematic, cholesteric (chiral nematic), and smectic. For a liquid crystal to be used in a display device, it must typically be made to align in a defined manner in the "off" state and in a different defined manner in the "on" state, so that the display has different optical properties in each state. Two principal alignments are homeotropic (where the director is substantially perpendicular to the plane of the cell walls) and planar (where the director is inclined substantially parallel to the plane of the cell walls). In practice, planar alignments may be tilted with respect to the plane of a cell wall, and this tilt can be useful in aiding switching.

Hybrid Aligned Nematic (HAN), Vertical Aligned Nematic (VAN), Twisted nematic (TN) and super-twisted nematic (STN) cells are widely used as display devices in consumer and other products. The cells comprise a pair of opposed, spaced-apart cell walls with nematic liquid crystal material between them. The walls have transparent electrode patterns that define pixels between them.

In TN and STN displays, the inner surface of each wall is treated to produce a planar unidirectional alignment of the nematic director, with the alignment directions being at 90° to each other. This arrangement causes the nematic director to describe a quarter helix within the TN cell, so that polarised light is guided through 90° when a pixel is in the "field off" state. In an STN cell, the nematic liquid crystal is doped with a chiral additive to produce a helix of shorter pitch which rotates the plane of polarisation in the "field off" state. The "field off" state may be either white or black, depending on whether the cell is viewed through crossed or parallel polarisers. Applying a voltage across a pixel causes the nematic director to align normal to the walls in a homeotropic orientation, so that the plane of polarised light is not rotated in the "field on" state.

In a HAN cell, one wall is treated to align a nematic LC in a homeotropic alignment and the other wall is treated to induce a planar alignment, typically with some tilt to facilitate switching. The LC has positive dielectric anisotropy, and application of an electric field causes the LC directors to align normal to the walls so that the cell switches from a birefringent "field off" state to a non-birefringent "field on" state.

In the VAN mode, a nematic LC of negative dielectric anisotropy is homeotropically aligned in the "field off" state, and becomes birefringent in the "field on" state. A dichroic dye may be used to enhance contrast.

Liquid crystal (LC) planar alignment is typically effected by the unidirectional rubbing of a thin polyimide alignment layer on the interior of the LC cell, which gives rise to a unidirectional alignment with a small pretilt angle. It has been proposed to increase the pretilt angle for a rubbed surface by incorporating small projections in the rubbed alignment layer, in "Pretilt angle control of liquid-crystal alignment by using projections on substrate surfaces for dual-domain TN-LCD" T. Yamamoto et al, J. SID, Apr. 2, 1996.

Whilst having a desirable effect on the optical characteristics of the device, the rubbing process is not ideal as this requires many process steps, and high tolerance control of the rubbing parameters is needed to give uniform display substrates. Moreover, rubbing may cause static and mechanical damage of active matrix elements which sit under the alignment layer. Rubbing also produces dust, which is detrimental to display manufacture.

Photoalignment techniques have recently been introduced whereby exposure of certain polymer coating to polarised UV light can induce planar alignment. This avoids some of the problems with rubbing, but the coatings are sensitive to LC materials, and typically produce only low pre-tilt angles.

An alternative is to use patterned oblique evaporation of silicon oxide (SiO) to form the alignment layer. This also effects a desired optical response; however the process is complicated by the addition of vacuum deposition and a lithography process. Moreover, control of process parameters for SiO evaporation is critical to give uniformity, which is typically difficult to achieve over large areas.

A useful summary of methods of aligning liquid crystals is given in "Alignment of Nematic Liquid Crystals and Their Mixtures", J. Cognard, Mol. Cryst. Liq. Cryst. 1-78 (1982) Supplement 1.

The use of surface microstructures to align LCs has been known for many years, for example as described in "The Alignment of Liquid Crystals by Grooved Surfaces" D. W. Berriman, Mol. Cryst. Liq. Cryst. 23 215-231 1973.

It has been proposed in GB 2 286 467 to provide a sinusoidal bigrating on at least one cell wall, by exposing a photopolymer to an interference pattern of light generated by a laser. The bigrating permits the LC molecules to lie in two different planar angular directions, for example 45° or 90° apart. An asymmetric bigrating structure can cause tilt in one or both angular directions. Other examples of alignment by gratings are described in WO 96/24880, WO 97/14990 WO 99/34251, and "The liquid crystal alignment properties of photolithographic gratings", J. Cheng and G. D. Boyd, Appl. Phys. Lett. 35(6) Sep. 15, 1979. In "Mechanically Bistable Liquid-Crystal Display Structures", R. N. Thurston et al, IEEE trans. on Electron Devices, Vol. ED-27 No 11, November 1980, LC planar alignment by a periodic array of square structures is theorised.

LC homeotropic alignment is also a difficult process to control, typically using a chemical treatment of the surface, such as lecithin or a chrome complex. These chemical treatments may not be stable over time, and may not adhere very uniformly to the surface to be treated. Homeotropic alignment has been achieved by the use of special polyimide resins (Japan Synthetic Rubber Co). These polyimides need high temperature curing which may not be desirable for low glass transition plastic substrates. Inorganic oxide layers may induce homeotropic alignment if deposited at suitable angles. This requires vacuum processes which are subject to the problems discussed above in relation to planar alignment. Another possibility for producing homeotropic alignment is to use a low surface energy material such as PTFE. However, PTFE gives only weak control of alignment angle and may be difficult to process.

It has been proposed, in EP 1 139 153 and EP 1 139 154, to provide a surface alignment structure comprising an array of alignment features which are shaped and/or orientated to produce a desired alignment. Depending on the geometry and spacing of the features the LC may be induced to adopt a planar, tilted, or homeotropic alignment. Such alignment structures have been used to provide bistable alignment in the Post Aligned Bistable Nematic ("PABN") mode, as disclosed in EP 1 139 151.

In U.S. Pat. No. 5,155,610 and U.S. Pat. No. 5,262,882 it has been proposed to provide a surface layer of an anisotropic gel or polymer network containing non-reactive LC material on a substrate. The gel can effect an inclined orientation of LC molecules. The surface layer contains liquid crystal molecules, the orientation of at least a part of the molecules being permanently fixed in the anisotropic gel. The angle of inclination of the molecules of the layer differs maximally from a minimum at the interface with the substrate to a maximum at the interface with the LC material when the layer is sufficiently thick. The layer is applied in a thickness to produce a desired angle of inclination at the interface with the LC material.

In addition to controlling the alignment of LC molecules at cell wall surfaces, it is desirable to be able to control, or "tune" the anchoring energy at each surface. By doing this, the cell performance may be optimised for different display modes, for example HAN or VAN modes, or the bistable mode described in "Fast bistable nematic display using monostable surface switching", I. Dozov et al, *Appl. Phys. Lett.* 70(9), Mar. 3, 1997. Here, different SiO thicknesses were used to provide different anchoring strengths. As discussed above, SiO evaporation is commercially undesirable for various reasons.

It is known from U.S. Pat. No. 5,073,294 to make a LC polymer film or fibre comprising polymeric liquid crystals having aligned multiple oriented mesogens. The products are said to be useful as high resolution imaging films, packaging films, filtration membranes, laminated films, waveguide devices and optical fibres.

SUMMARY OF THE INVENTION

According to a first aspect of the present invention there is provided a liquid crystal display device comprising first and second opposed spaced-apart cell walls enclosing a layer of a liquid crystal material, electrodes on at least one cell wall for applying an electric field across at least some of the liquid crystal material, the inner surface of the first cell wall being provided with a surface layer substantially comprising a polymerised aligned mesogenic material, which surface layer is in contact with the liquid crystal material.

In a preferred embodiment, both cell walls are provided with a polymerised mesogenic coating. The coatings may be the same or different. Where the coatings are different, this permits different anchoring energies and/or different order parameters to be induced adjacent each surface coating, which can be of benefit in certain display modes as previously discussed. Accordingly, another aspect of the invention provides a liquid crystal device comprising first and second opposed spaced-apart cell walls enclosing a layer of a liquid crystal material, electrodes on at least one cell wall for applying an electric field across at least some of the liquid crystal material, at least a part of the inner surface of the first cell wall being provided with a first surface layer formed from a polymerised aligned mesogenic material, and at least a part of the inner surface of the second cell wall being provided with a second surface layer formed from a polymerised aligned mesogenic material, which surface layers are in contact with the liquid crystal material at first and second interfaces respectively; wherein the anchoring energy at the first interface is different from the anchoring energy at the second interface.

A further aspect of the invention provides a method of manufacturing a liquid crystal device in accordance with the first aspect of the invention, comprising the steps of:
a) applying a polymerisable mesogen to a first cell wall and polymerising the mesogen under a first condition to form a first aligned surface layer;
b) applying a polymerisable mesogen to a second cell wall and polymerising the mesogen under a second, different, condition to form a second aligned surface layer:
c) constructing a cell in which the first and second cell walls are opposed and spaced apart from each other with the surface layers on the inner surfaces of the cell walls; and
d) filling the cell with a liquid crystal material;
wherein electrodes are provided on at least one cell wall for applying an electric field across the liquid crystal material;
whereby the conditions under which the first and second surface layers are formed are such as to produce different anchoring energies at the interfaces of the surface layers with the liquid crystal material.

For a thermotropic mesogenic material, the condition which is varied is preferably the temperature at which polymerisation is carried out. For lyotropic mesogenic materials, the condition which is varied is preferably dilution, although the temperature could also be varied.

The term "polymerisation" and related terms are used herein to refer to curing of a mesogenic system in which the mesogenic molecules become chemically bound in a polymer matrix so that the local order parameter of the mesogenic molecules becomes fixed. The mesogenic molecules may be provided with polymerisable or cross-linkable functional groups, for example acrylic, epoxy, or methacrylic groups, so that they react with each other. Additionally, or alternatively, the mesogenic molecules may react with another entity to produce a polymer matrix incorporating mesogenic moieties. For example, the mesogenic molecules may be provided with unsaturated linkages such as terminal alkene groups that react with fluid polymers or oligomers such as poly(methyl hydrogen siloxane), in the presence of a suitable catalyst, by a hydrosilylation reaction.

By using appropriate conditions, the two layers may be formed with the mesogenic moieties having substantially the same alignment but different order parameters. In the case of thermotropic LCs, polymerising at a higher temperature will result in a decreased order parameter.

In turn, the order parameter of the mesogenic moieties in the layers will affect the local order parameter of the LC molecules adjacent the layers. Other factors being equal, the anchoring energy at the interface with the layer of lower order parameter is expected to be reduced. Thus, both surface layers may be chemically identical but produce an unsymmetrical response to an applied electric field. Displays constructed in this manner may produce a sign-dependent response or exhibit an "orderelectric" effect, analogous to the flexoelectric effect.

Typically, the polymerisable mesogenic material will be applied to the cell walls by spin-coating against an air interface to produce a layer from about 10 to 100 nm thick, notably 20 to 40 nm. However, other coating thicknesses may also be employed. Any other suitable coating methods may be used, well known to those skilled in the art; for example gravure, flexo- or curtain coating.

In a surface layer which substantially comprises a polymerised mesogenic material, most mesogenic molecules in the layer are chemically bonded in a polymer matrix. At least 50% of the mesogenic molecules are bonded, preferably at least 70%. Preferably substantially all of the mesogenic molecules in the surface layer are polymerised; however the nature of the polymerisation conditions may prevent polymerisation of 100% of the mesogenic molecules. The layer is thin and solid, and effects alignment of LC molecules adjacent the layer. However, the properties of the surface layer may be modified by varying the mesogen monomer mixture. For example non-mesogenic monomers may be incorporated in the polymerisation mixture, or (for lyotropic mesogens) solvent diluents may be varied. Additionally, or alternatively, the polymerisation temperature may be varied.

It is expected that particularly large differences in order parameter and anchoring energy will be achieved where the curing temperatures of each surface layer are selected to fall either side of a phase transition of the mesogen. For example the mesogen may exhibit smectic alignment at the lower temperature and nematic alignment at a higher temperature. The two phases could both be smectic, one being more ordered than the other; for example Smectic A and Smectic B. In another embodiment, curing at one temperature produces a tilted alignment, for example a tilted smectic such as Smectic C, while curing at another temperature produces a non-tilted phase such as Smectic A or nematic. After curing, the phase adopted by the mesogen during curing is retained unless the polymer is annealed above its glass transition temperature.

Thus, the surface layer(s) may be used to provide any desired LC alignment, including planar, tilted planar, homeotropic, and tilted homeotropic local alignment. The local order parameter, and hence anchoring energy, can be independently varied by appropriate selection of polymerisation conditions.

For most conventional display devices, each cell wall will be provided with an electrode pattern in known manner. However it would also be possible to provide both electrode structures on one or both cell walls, as interdigitated electrodes, to provide an electric field substantially parallel with the plane of the cell walls.

To align the surface layers, an alignment layer may be provided between the cell wall and the surface layer. Known alignment layers may be used, for example rubbed polymers, a microstructured surface, or other ordered material such as a polymer formed while exposed to polarised ultraviolet light. Additionally, or alternatively, the layer may be self-ordering, for example by adopting homeotropic alignment at an air boundary. Careful control of the curing temperature or dilution will give a control of the order parameter varying down to zero (isotropic).

BRIEF DESCRIPTION OF THE DRAWING

The sole FIGURE is a diagram of a liquid crystal display devise in accordance with the invention.

DETAILED DESCRIPTION

Figure 1:
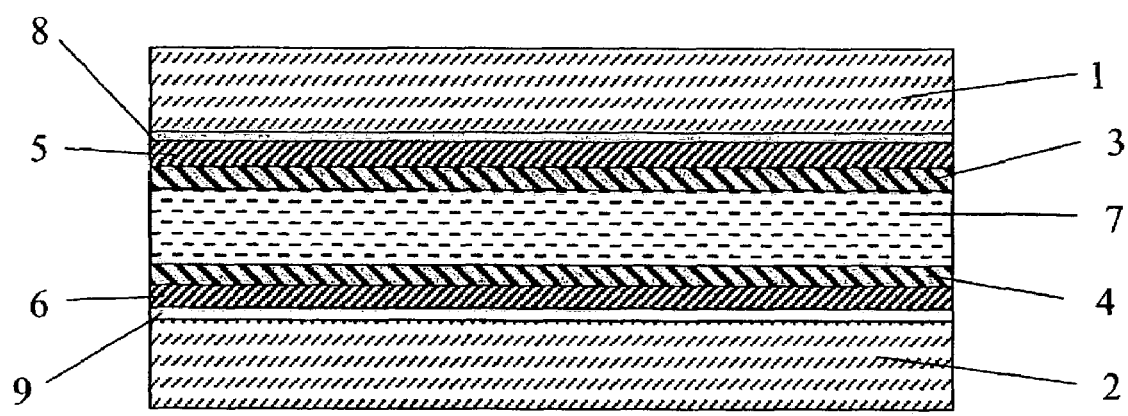

A liquid crystal display device comprises first 1 and second 2 cell walls formed from glass or other suitable substrate. The inner surface of each cell wall 1, 2 carries a transparent electrode pattern 8, 9 formed from indium tin oxide or the like. Each cell wall has an alignment layer 5, 6 of a type known per se, for example a rubbed polymer such as poly(imide) or a grating microstructure. On top of each alignment layer 5, 6 is a surface layer 3, 4 formed by polymerising a mesogenic monomer. The mesogenic monomers in each surface layer 3, 4 are uniformly aligned by the alignment layers and/or by self-organisation during polymerisation prior to construction of the cell.

The cell walls are spaced apart by known means, for example spacer balls (not shown) between the surface layers 3, 4. The space between the surface layers 3, 4 is filled with a layer 7 of a liquid crystal material, which is in contact with both surface layers.

Depending on the polymerisation temperature, and/or the level of non-mesogenic monomer present during polymerisation, each surface layer 3, 4 influences adjacent LC molecules in the layer 7 of liquid crystal material. The anchoring energy at the interface between each surface layer 3, 4 and the layer 7 of liquid crystal can be "pre-tuned" by suitable adjustment of the polymerisation conditions, as can the order parameter of the LC local to each surface layer so that the display is optimised for a particular display mode. A surface layer may be provided on both cell walls, as illustrated in this example, or on only one of the cell walls. The other cell wall may be constructed in accordance with methods well known in the art to achieve a desired alignment.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

What is claimed is:

1. A liquid crystal device comprising first and second opposed spaced-apart cell walls enclosing a layer of a liquid crystal material, electrodes on at least one cell wall for applying an electric field across at least some of the liquid crystal material, at least a part of the inner surface of the first cell wall including a polymerised aligned mesogenic material first surface layer having an order parameter, and at least a part of the inner surface of the second cell wall including a polymerized aligned mesogenic material second surface layer having an order parameter different form the order parameter of the first surface layer, which surface layers are in contact with the liquid crystal material at first and second interfaces respectively; the anchoring energy at the first interface differing from the anchoring energy at the second interface, wherein control of the anchoring energy at each of the interfaces between the liquid crystal material and the surface layers by control of the order parameter is independent of tilt direction and angle of the liquid crystal material.

2. A device as claimed in claim 1, wherein the differences in anchoring energies and order parameters resut from polymerisation of the mesogenic material of the surface layers at different temperatures.

3. A device as claimed in claim 1, wherein both surface layers have the same mesogenic material.

4. A device as claimed in claim 1, further including an alignment layer between each surface layer and its associated cell wall, the alignment layer determining the alignment of the mesogenic material.

5. The device of claim 4 wherein the anchoring energy at each of the interfaces between the liquid crystal material and the surface layers is substantially independent of the orientation that each of the alignment layers induces in the liquid crystal material at each interface.

6. A device as claimed in claim 1, wherein the liquid crystal material has a tilted alignment with respect to the plane of the cell walls at each interface.

7. A device as claimed in claim 6, wherein the tilt angle is substantially the same at both interfaces.

8. A device as claimed in claim 6, wherein the tilt direction is substantially the same at both interfaces.

9. A liquid crystal device comprising first and second opposed spaced-apart cell walls enclosing a layer of a liquid crystal material, electrodes on at least one cell wall for applying an electric field across at least some of the liquid crystal material, at least a part of the inner surface of the first cell wall including a first surface layer formed from a polymerised aligned mesogenic material, and at least a part of the inner surface of the second cell wall including a second surface layer formed from a polymerlsed aligned mesogenic material, which surface layers are in contact with the liquid crystal material at first and second interfaces respectively; the anchoring energy at the first interface differing from the anchoring energy at the second interface; the alignment of the mesogenic material being homeotropic resulting from self-alignment at a gas boundary during polymerisation.

10. A liquid crystal device comprising first and second opposed spaced-apart cell walls enclosing a layer of a liquid crystal material, electrodes on at least one cell wall for applying an electric field across at least some of the liquid crystal material, at least a part of the inner surface of the first cell wall including a first surface layer including a polymerised aligned mesogenic material, the first surface layer having an order parameter, and at least a part of the inner surface of the second cell wall including a second surface layer including a polymerized aligned mesogenic material, the second surface layer having an order parameter different form the order parameter of the first surface layer, which surface layers are in contact with the liquid crystal material at first and second interfaces respectively; the anchoring energy at the first interface differing from the anchoring energy at the second interface, wherein control of the anchorinq energy at each of the interfaces between the liquid crystal material and the surface layers by control of the order parameter is independent of tilt direction and angle of the liquid crystal material.

11. A device as claimed in claim 10, wherein the differences in anchoring energies and order parameters result from the mesogenic material of first and second surfaces having different properties.

12. A device as claimed in claim 11, wherein the same mesogenic material is included in both surface layers.

13. A device as claimed in claim 10, wherein the same mesogenic material is included in both surface layers.

14. A device as claimed in claim 10, further including an alignment layer for the mesogenic material between each surface layer and its associated cell wall.

15. A device as claimed in claim 10, wherein the liquid crystal material has a tilted alignment with respect to the plane of the cell walls at each interface.

16. A device as claimed in claim 15, wherein the tilt angle is substantially the same at both interfaces.

17. A device as claimed in claim 15, wherein the tilt direction is substantially the same at both interfaces.

18. A liquid crystal device comprising first and second opposed spaced-apart cell walls enclosing a layer of a liquid crystal material, electrodes on at least one cell wall for applying an electric field across at least some of the liquid crystal material, at least a part of the inner surface of the first cell wall including a first surface layer including a polymerised aligned mesogenic material, and at least a part of the inner surface of the second cell wall including a second surface layer including a polymerised aligned mesogenic material, which surface layers are in contact with the liquid crystal material at first and second interfaces respectively; the anchoring energy at the first interface differing from the anchoring energy at the second interface; the alignment of the mesogenic material being homeotropic.

19. A liquid crystal device comprising first and second opposed spaced-apart cell walls enclosing a layer of a liquid crystal material, electrodes on at least one cell wall for applying an electric field across at least some of the liquid crystal material, at least a part of the inner surface of the first cell wall including a first surface layer including a polymerised aligned mesogenic material, the first surface layer having an order parameter, and at least a part of the inner surface of the second cell wall including a second surface layer including a polymerized aligned mesogenic material, the second surface layer having an order parameter different form the order parameter of the first surface layer, which surface layers are in contact with the liquid crystal material at first and second interfaces respectively; the polymerized mesogenic materials of the first and second cell walls causing the anchoring energy at the first interface to differ from the anchoring energy at the second interface, wherein control of the anchoring energy at each of the interfaces between the liquid crystal material and the surface layers by control of the order parameter is independent of tilt direction and angle of the liquid crystal material.

20. A device as claimed in claim 19, wherein the differences in anchoring energies and order parameters result from polymerization of the mesogenic material of the surface layers at different temperatures.

21. A device as claimed in claim 19, wherein the same mesogenic material is included in both surface layers.

22. A device as claimed in claim 19, further including an alignment layer for the mesogenic material between each surface layer and its associated cell wall.

23. A device as claimed in claim 19, wherein the liquid crystal material has a tilted alignment with respect to the plane of the cell walls at each interface.

24. A device as claimed in claim 23, wherein the tilt angle is substantially the same at both interfaces.

25. A device as claimed in claim 23, wherein the tilt direction is substantially the same at both interfaces.

26. A liquid crystal device comprising first and second opposed spaced-apart cell walls enclosing a layer of a liquid crystal material, electrodes on at least one cell wall for applying an electric field across at least some of the liquid crystal material, at least a part of the inner surface of the first cell wall including a first surface layer including a polymerised aligned mesogenic material, the first surface layer having an order parameter, and at least a part of the inner surface of the second cell wall including a second surface layer including a polymerised aligned mesogenic material, the second surface layer having an order parameter different form the order parameter of the first surface layer, which surface layers are in contact with the liquid crystal material at first and second interfaces respectively; the polymerised mesogenic materials of the first and second cell walls causing the anchoring energy at the first interface to differ from the anchoring energy at the second interface, wherein the polymerised mesogenic materials of the first and second cell walls have differing properties, and wherein control of the anchoring energy at each of the interfaces between the liquid crystal material and the surface layers by control of the order parameter is independent of tilt direction and angle of the liquid crystal material.

27. A liquid crystal device comprising first and second opposed spaced-apart cell walls enclosing a layer of a liquid crystal material, electrodes on at least one cell wall for applying an electric field across at least some of the liquid crystal material, at least a part of the in ner surface of the first cell wall including a first surface layer including a polymerised aligned mesogenic material, and at least a part of the inner surface of the second cell wall including a second surface layer including a polymerised aligned mesogenic material, which surface layers are in contact with the liquid crystal material at first and second interfaces respectively; the polymerized mesogenic materials of the first and second cell walls causing the anchoring energy at the first interface to differ from the anchoring energy at the second interface wherein the polymerized mesogenic materials of the first and second cell walls have differing properties; the alignment of the mesogenic material being homeotropic.

* * * * *